(12) United States Patent
Gorshkov et al.

(10) Patent No.: US 8,052,955 B2
(45) Date of Patent: Nov. 8, 2011

(54) LITHIUM-BASED MATERIALS AND METHODS OF FORMING THE SAME

(75) Inventors: Vadim Gorshkov, Ekaterinburg (RU); Oleg Volkov, Fishers, IN (US)

(73) Assignee: EnerDel, Inc., Indianapolis, IN (US)

( * ) Notice: Subject to any disclaimer, the term of this patent is extended or adjusted under 35 U.S.C. 154(b) by 0 days.

(21) Appl. No.: 12/912,506

(22) Filed: Oct. 26, 2010

(65) Prior Publication Data

US 2011/0044886 A1    Feb. 24, 2011

Related U.S. Application Data

(63) Continuation of application No. 12/152,352, filed on May 14, 2008, now Pat. No. 7,820,137.

(51) Int. Cl.
*C01G 23/00*    (2006.01)

(52) U.S. Cl. .......................................... 423/598; 429/69

(58) Field of Classification Search .............. 180/313; 423/69, 71, 598; 429/27, 40, 209, 231.1, 429/231.5, 231.95
See application file for complete search history.

(56) References Cited

U.S. PATENT DOCUMENTS

| | | | |
|---|---|---|---|
| 5,545,468 A | 8/1996 | Koshiba et al. | |
| 6,022,640 A | 2/2000 | Takada et al. | |
| 6,139,815 A | 10/2000 | Atsumi et al. | |
| 6,221,531 B1 | 4/2001 | Vaughey et al. | |
| 6,645,673 B2 * | 11/2003 | Yamawaki et al. | 429/231.5 |
| 6,890,510 B2 | 5/2005 | Spitler et al. | |
| 6,916,579 B2 | 7/2005 | Gorchkov et al. | |
| 2001/0031401 A1 | 10/2001 | Yamawaki et al. | |
| 2002/0197532 A1 | 12/2002 | Thackeray et al. | |
| 2003/0017104 A1 | 1/2003 | Spitler et al. | |

FOREIGN PATENT DOCUMENTS

JP    2002-211925    7/2002

OTHER PUBLICATIONS

Deschanvres et al., "Mise En Evidence Et Etude Cristallographique D'Une Nouvelle Solution Solid De Type Spinelle . . . " Mat. Res. Bull, vol. 61, pp. 699-704, 1971.

Roy et al., "Preparation and Superconducting Properties of Lithium Titanate." IEEE Transactions on Magnetics, vol. MAG-13, No. 1, pp. 836-839, Jan. 1977.

Colbow et al., "Structure and Electrochemistry of the Spinel Oxides $LiTi_2O_4$ and $Li_{4/3}Ti_{5/3}O_4$" J. of Power Sources, v. 26, pp. 397-402, 1989.

(Continued)

*Primary Examiner* — Stuart Hendrickson
*Assistant Examiner* — Richard M Rump
(74) *Attorney, Agent, or Firm* — Ice Miller LLP

(57) ABSTRACT

Lithium-based materials and methods of forming the same. In at least one embodiment of a method of forming a lithium-based material of the present disclosure, the method comprises the steps of combining a first quantity of a first lithium-based component and a second quantity of a second lithium-based component with a titanium-based component to form a mixture, the first lithium-based component having a first melting point and the second lithium-based component having a second melting point higher than the first melting point of the first lithium-based component, and heating the mixture to a first temperature above the first melting point but below the second melting point for a period of time to form a resultant end product.

24 Claims, 13 Drawing Sheets

OTHER PUBLICATIONS

Ohzuku et al., "Zero-strain Insertion Material of Li[Li1/3Ti5/3]O4 for Rechargeable Lithium Cells" J. of Electrochemical Society, v. 142, No. 5, pp. 1431-1435, 1995.

Nakayama et al., "Mixed Conduction for the Spinel Tyle (1-x) Li4/3Ti5/3O4-xLiCrTiO4 System." Solid State Ionics, v. 117, pp. 265-271, 1999.

Scharner et al., "Evidence of Two-Phase Formation Upon Lithium Insertion into the Li1.33Ti1.67O4 Spinel." J. of Electrochemical Society, vol. 146, No. 3, pp. 857-861, 1999.

Kubiak et al., "Phase Transition in the Spinel Li4T15O12 Induced by Lithium Insertion Influence of the Sub's Ti/v, Ti/Mn, Ti/Fe."J. of Power Sources,v.119-121,pp. 626-630,2003.

International Searching Authority, International Search Report, PCT/US2007/008753, dated Apr. 4, 2008.

International Searching Authority (ISA), Written Opinion of the ISA, PCT/US2007/008753, dated Apr. 4, 2008.

International Searching Authority (ISA), International Search Report and Written Opinion of the ISA, PCT/US2009/043962, dated Jun. 26, 2009.

* cited by examiner

LITHIUM-BASED MATERIALS AND METHODS OF FORMING THE SAME

PRIORITY

The present U.S. continuation application is related to, and claims the priority benefit of, U.S. patent application Ser. No. 12/152,352, filed May 14, 2008 and issued as U.S. Pat. No. 7,820,137 on Oct. 26, 2010, which (i) is related to, claims the priority benefit of, and is a continuation-in-part application of, U.S. patent application Ser. No. 11/462,520, filed Aug. 4, 2006 and issued as U.S. Pat. No. 7,541,016 on Jun. 2, 2006, which is related to, and claims the priority benefit of, U.S. Patent Application Ser. No. 60/744,635, filed Apr. 11, 2006, and (ii) is related to, and claims the priority benefit of, U.S. Patent Application Ser. No. 60/917,721, filed May 14, 2007. The contents of each of these applications are hereby incorporated by reference in their entirety into this disclosure.

BACKGROUND

The disclosure of the present application generally relates to various lithium-based materials and methods of forming the same, which includes, but is not limited to, various lithium titanates having excellent electronic conductivity and excellent electric power-generating capacity.

Motor vehicles such as, for example, hybrid vehicles use multiple propulsion systems to provide motive power. The most common hybrid vehicles are gasoline-electric hybrid vehicles, which include both an internal-combustion engine (ICE) and an electric motor. The gasoline-electric hybrid vehicles use gasoline to power the ICE, and an electric battery to power the electric motor. The gasoline-electric hybrid vehicles recharge their batteries by capturing kinetic energy. The kinetic energy may be provided via regenerative braking or, when cruising or idling, from the output of the ICE. This contrasts with pure electric vehicles, which use batteries charged by an external source such as a power grid or a range extending trailer.

The batteries include rechargeable lithium-based cells that typically comprise two dissimilar electrodes, i.e., an anode and a cathode, that are immersed in an ion conducting electrolyte, with a separator positioned between the two electrodes. Electrical energy is produced in the cells by an electrochemical reaction that occurs between the two dissimilar electrodes.

The largest demand placed on the battery occurs when it must supply current to operate the electric motor during acceleration, especially during start-up of the electric motor. The amperage requirements of the electric motor may be over several hundred amps. Most types of batteries that are capable of supplying the necessary amperage have a large volume or require bulky packaging, which results in excessive weight of the batteries and adds cost to the batteries. At the same time, such high currents are only required for short periods of time, usually seconds. Therefore, so called "high-rate" batteries, which provide high currents for short periods of time, are typically ideal for hybrid and pure electric vehicle applications.

Rechargeable batteries that include rechargeable lithium-based cells, which may be characterized as either lithium cells, lithium ion cells, or lithium polymer cells, combine high electric power-generating capacity with the potential for power and cycle-life needed to enable the hybrid vehicles to meet performance standards while remaining economical. By "high electric power-generating capacity", it is meant that the rechargeable batteries have four times the energy density of lead-acid batteries and two to three times the energy density of nickel-cadmium and nickel-metal hydride batteries. Rechargeable batteries including the lithium-based cells also have the potential to be one of the lowest-cost battery systems.

Lithium titanate represented by the formula $Li_4Ti_5O_{12}$ (or $Li_{4/3}Ti_{5/3}O_4$) is considered to be one of the most prospective materials for use in the anodes of rechargeable lithium ion and lithium polymer cells. Lithium titanate, $Li_4Ti_5O_{12}$, is known from A. Deschanvers et al. (Mater. Res. Bull., v. 6, 1971, p. 699). As it was later published by K. M. Colbow et al. (J. of Power Sources, v. 26, N. 3/4, May 16, 1989, pp. 397-402), $Li_4Ti_5O_{12}$ is able to act in a reversible electrochemical reaction, while elemental lithium is incapable of such reversible reactions. After detailed research conducted by T. Ozhuku et al. (J. of Electrochemical Society, v. 142, N. 5, 1995, pp. 1431-1435) the $Li_4Ti_5O_{12}$ started to become considered for use as an anode material for rocking-chair type lithium cells. In fact, U.S. Pat. No. 5,545,468 to Koshiba et al, discloses the use of a lithium titanate having varying ratios of lithium to titanium in the lithium titanate. More specifically, the lithium titanate of the '468 patent is of the formula $Li_xTi_yO_4$, wherein $0.8 \leq x \leq 1.4$ and $1.6 \leq y \leq 2.2$, in a cathode for a lithium cell. The '468 patent specifies that fundamentally, $x+y \approx 3$. In other words, the '468 patent teaches that the lithium titanate may include different ratios of lithium to titanium, so long as the amount of lithium and titanium together about 3 such that there is a stoichiometric amount of lithium and titanium to oxygen. United States Patent Publication No. 2002/0197532 to Thackeray et al. also discloses a lithium titanate that is used as an anode in a lithium cell. The lithium titanate may be a stoichiometric or defect spinel, in which the distribution of lithium can vary from compound to compound.

In addition to an ability to act in the reversible electrochemical reaction, $Li_4Ti_5O_{12}$ also has other advantages that make it useful in rechargeable lithium-based cells. For example, due to a unique low volume change of the lithium titanate during the charge and discharge processes, the lithium titanate has excellent cycleability, i.e., many cycles of charging and discharging may occur without deterioration of the cells. The excellent cycleability of the lithium titanate is primarily due to a cubic spinel structure of $Li_4Ti_5O_{12}$. According to data of S. Scharner et al. (J. of Electrochemical Society, v. 146, N. 3, 1999, pp. 857-861) a lattice parameter of the cubic spinel structure (cubic, Sp. gr. Fd-3m (227)) varies from 8.3595 to 8.3538 Å for extreme states during charging and discharging. This linear parameter change is equal to a volume change of about 0.2%. $Li_4Ti_5O_{12}$ has an electrochemical potential versus elemental lithium of about 1.55 V and can be intercalated with lithium to produce an intercalated lithium titanate represented by the formula $Li_4Ti_5O_{12}$, which has a theoretical electric power-generating capacity of up to and including 175 mA*hrs/g.

Another advantage of $Li_4Ti_5O_{12}$ is that it has a flat discharge curve. More specifically, the charge and discharge processes of $Li_4Ti_5O_{12}$ take place in a two-phase system. $Li_4Ti_5O_{12}$ has a spinel structure and, during charging, transforms into $Li_7Ti_5O_{12}$, which has an ordered rock-salt type structure. As a result, electric potential during the charge and discharge processes is determined by electrochemical equilibrium of the $Li_4Ti_5O_{12}/Li_7Ti_5O_{12}$ pair, and is not dependant on lithium concentration. This is in contrast to the discharge curve of most other electrode materials for lithium power sources, which maintain their structure during the charge and discharge processes. For example, although a transition of a charged phase in most cathode materials such as $LiCoO_2$ is pre-determined, there is still an extended limit of variable composition $Li_xCoO_2$ between these structures. As a result, electrical potential of materials such as $LiCoO_2$ depends on a lithium concentration in the $LiCoO_2$, i.e., a state of charge or discharge. Thus, a discharge curve in materials in which the electrical potential is dependent on the lithium concentration in the material is typically inclined and is often a step-like curve.

There is a general consensus within the art that maintenance of excellent electric power generating capacity correlates to excellent electronic conductivity. $Li_4Ti_5O_{12}$ includes titanium in a highest oxidation degree of +4, which correlates to very low electronic conductivity. An electronic conductivity of similar compounds is so low that many of those compounds are borderline dielectrics or insulators. As such, power generating capacity of $Li_4Ti_5O_{12}$ is less than ideal. The same holds true for the lithium titanates of the '468 patent and the '532 publication, as set forth above.

Typically, electronic conductivity of the $Li4Ti5O12$ is improved by doping the $Li_4Ti_5O_{12}$ with 3d-elements, as disclosed by M. Nakayama et al (Solid State Ionics, v. 117, I. 3-4, 2 Feb. 1999, pp. 265-271). For example, electronic conductivity of $Li[Li_{(1-x)/3}Cr_xTi_{(5-2x)/3}]O_4$, which is considered to be a solid solution between $Li_4Ti_5O_{12}$ and $LiCrTiO_4$, is better than electronic conductivity of the $Li_4Ti_5O_{12}$. However, an increase in the amount of Cr ions substituted for titanium ions in the $Li_4Ti_5O_{12}$ also decreases reversible electric power-generating capacity, as compared to $Li_4Ti_5O_{12}$, due to electrochemical inactivity attributable to the presence of the Cr ions. The presence of the Cr ions lowers area specific impedance (ASI) and increases rate capability, as compared to ASI and rate capability of $Li_4Ti_5O_{12}$. The loss in capacity is substantially equal to the share of replaced titanium.

Other attempts to replace the titanium in lithium titanates exhibit similar drawbacks. For example, substitution of titanium in $Li_4Ti_5O_{12}$ with vanadium, manganese, and iron results in significant loss of reversible electric power-generating capacity during a first charge-discharge cycle. See P. Kubiak, A. Garsia, M. Womes, L. Aldon, J. Olivier-Fourcade, P.-E. Lippens, J.-C. Jumas "Phase transition in the spinel $Li_4Ti_5O_{12}$ induced by lithium insertion. Influence of the substitution Ti/V, Ti/Mn, Ti/Fe" (J. of Power Sources, v. 119-121, Jun. 1, 2003, pp. 626-630).

In view of the foregoing, there remains an opportunity to provide a lithium titanate that is modified to exhibit excellent electronic conductivity while maintaining reversible electric power-generating capacity that is characteristic of lithium titanate. There is also an opportunity to provide a lithium-based cell that includes the lithium titanate.

BRIEF SUMMARY

The present disclosure provides a method for synthesizing lithium titanate that include 1) mixing lithium carbonate powder or lithium hydroxide powder with titanium oxide by various mixing methods and using the same as the precursor for calcination, 2) using a synthetic product or mixture containing titanium and lithium obtained from solutions containing both titanium and lithium ingredients as the precursor for calcination and 3) preparing a mixed slurry of titanium compound powder and a solution containing lithium, followed by depositing a lithium compound by spray-drying, to produce a mixture of titanium compound powder and lithium compound and using the same as the precursor for calcination. Each method utilizes production parameters to produce lithium titanate with the quality that satisfies the performance required of secondary batteries.

As such, the lithium titanate of the present disclosure is suitable for lithium-based cells that are used in rechargeable batteries that are a power source for electric motors in gasoline-electric hybrid vehicles, and the lithium titanate of the present disclosure materially contributes to the conservation of energy resources by improving performance of the lithium-based cells.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

A lithium titanate of the present disclosure is useful in lithium-based cells. The lithium-based cells including the lithium titanate of the present disclosure are useful in many applications, but are particularly useful in rechargeable batteries for vehicles 10, such as hybrid or electric vehicles 10; however, it is to be appreciated that the lithium-based cells may be used in non rechargeable batteries. The rechargeable batteries are a power source for an electric motor of the vehicles 10.

The lithium-based cells include an electrolyte, an anode, and a cathode. Electrolytes for the lithium-based cells are typically non-aqueous lithium ion-conducting electrolytes and are known in the art. At least one of the anode and the cathode includes the lithium titanate of the present disclosure. For example, the lithium-based cell may be further defined as a lithium cell, wherein the cathode comprises the lithium titanate of the present disclosure. The lithium titanate is typically present in the cathode in an amount of at least 80 parts by weight, more typically from 80 to 90 parts by weight, most typically in an amount of about 82 parts by weight based on the total weight of the cathode. In addition to the lithium titanate, the cathode in the lithium cell also typically includes a conductive agent such as carbon black along with a binder agent, such as polyvinylidene fluoride, which make up the balance of the cathode. More specifically, the carbon black is typically present in an amount of from 8 to 10 parts by weight, more typically about 8 parts by weight based on the total weight of the cathode, and the binder agent is typically present in an amount of from 8 to 12 parts by weight, more typically about 10 parts by weight, based on the total weight of the cathode. The anode in the lithium cells is typically a lithium metal or lithium alloy with magnesium or aluminum.

Alternatively, the lithium-based cell may be further defined as one of a lithium ion cell and a lithium polymer cell, wherein the anode comprises the lithium titanate of the present disclosure in the amounts set forth above.

Figure 1:
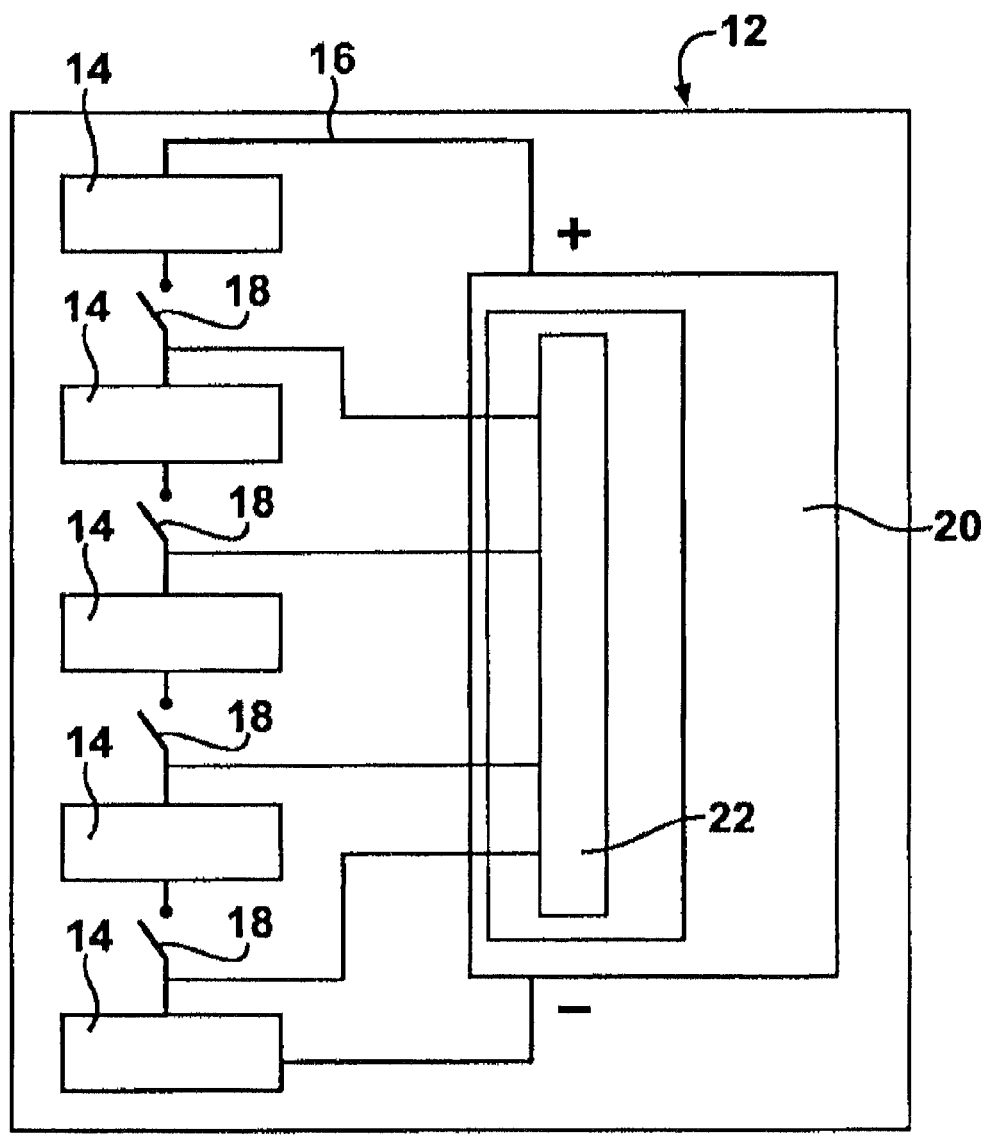
FIG. 1 is a schematic view of a rechargeable battery including lithium-based cells.
Figure 2:
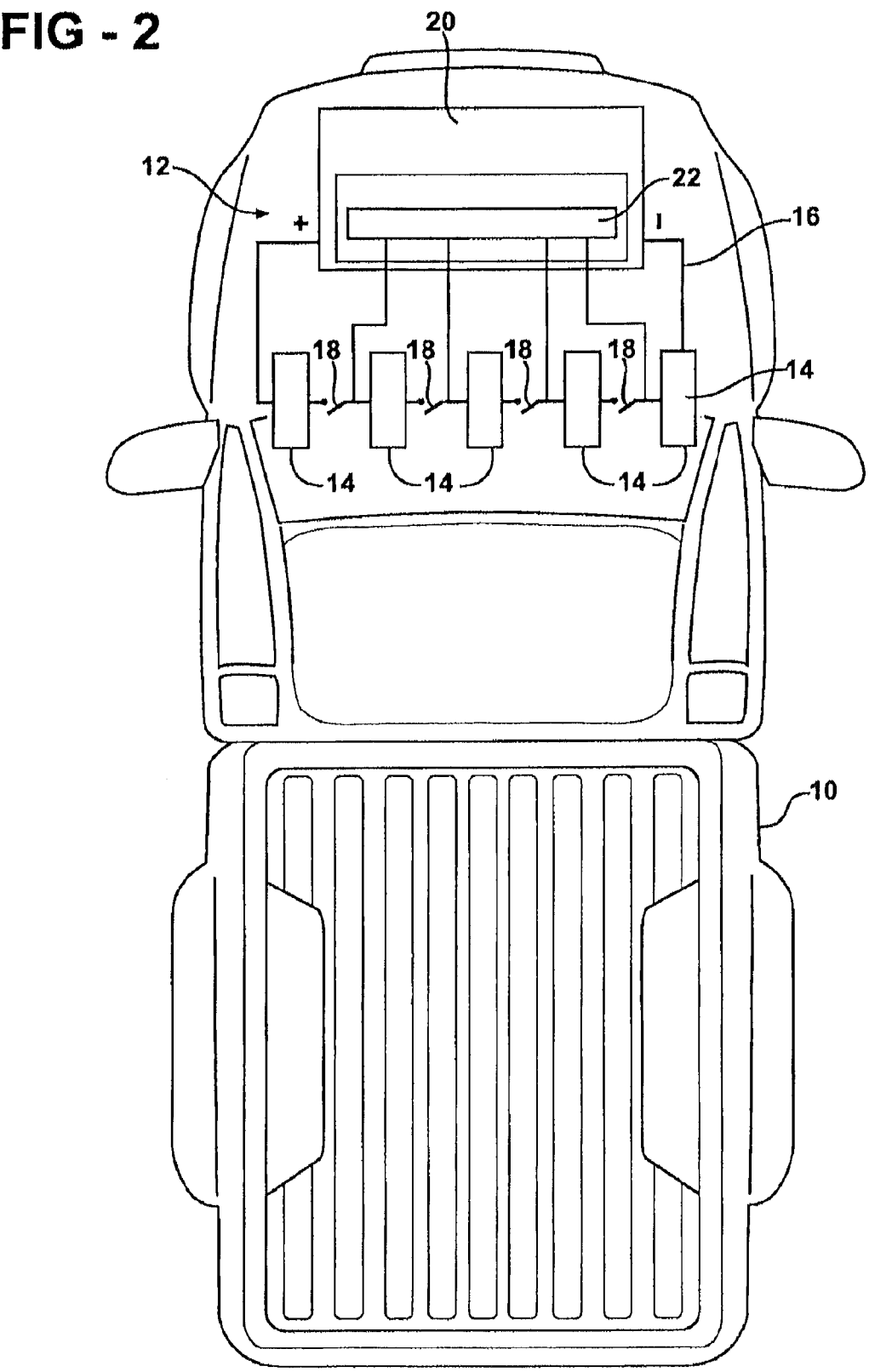
FIG. 2 is a schematic view of a vehicle including the rechargeable battery of FIG. 2.

When used in rechargeable batteries for hybrid or electric vehicles 10, the cells are typically used in a battery pack, represented by 14 in FIGS. 1 and 2. The battery packs 14 typically include four rows of the cells that are interconnected and extend along each row in overlapping relationship. Each row typically includes five stacks of the cells. However, it is to be appreciated that other configurations of the cells within the battery pack 14 may also be used.

As known in the art, the rechargeable batteries typically include a plurality of the battery packs 14 connected in a circuit in order to provide sufficient energy for powering the vehicle 10. As shown in FIGS. 1 and 2, the circuit is configured with switches 18 and a battery management system 20 disposed in the circuit 16. The battery management system 20 includes a switch control and interface circuit 22 to control energy usage and recharge of the cells in the battery packs 14.

The lithium titanate of the present disclosure has the following formula:

$$Li_4Ti_5O_{12-x}$$

wherein x is greater than 0. Typically, 0<x<0.02. In other words, the lithium titanate of the present disclosure is deficient of oxygen, which has excellent electronic conductivity, as compared to lithium titanate of the above formula that is not deficient of oxygen. At the same time, concentration of lithium in the lithium titanate of the present disclosure remains the same as for lithium titanate that is not deficient of oxygen. As a result, expected reversible electric power-generating capacity of the lithium titanate of the present disclosure will remain the same as the reversible electric power-generating capacity of lithium titanate that includes a stoichiometric amount of oxygen.

Figure 3:
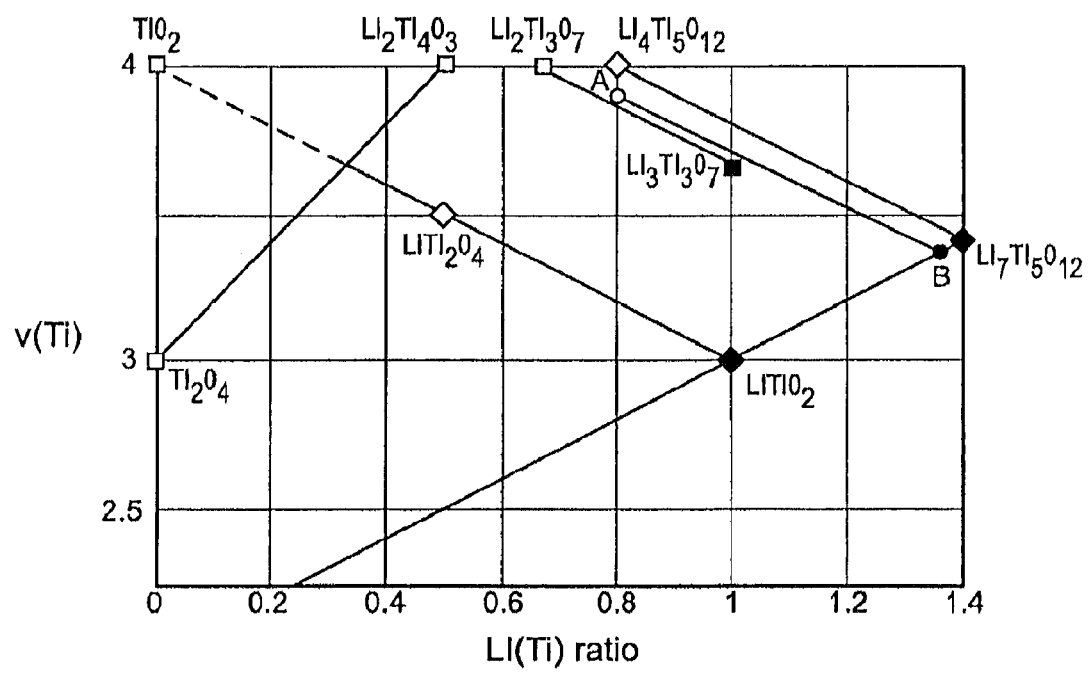
FIG. 3 is a lithium titanate composition-valence diagram showing a relationship between ratios of lithium to titanium in lithium titanate to a valence of titanium in the lithium titanate, with diamonds indicating spinel structures, squares indicating non-spinel structures, with filled symbols indicating lithium titanates that include intercalated lithium ions.

The effect on electronic conductivity as a result of the oxygen deficiency is attributable to changes in an oxidation state, i.e., valence, of the titanium in the lithium titanate. More specifically, lithium titanates that include titanium atoms in a +3 oxidation state exhibit high electronic conductivity that is characteristic of metal-like material, while lithium titanates that include titanium atoms in a +4 oxidation state exhibit low electronic conductivity that is characteristic of a dielectric material. Referring to FIG. 3, the oxidation state of various lithium titanates is represented on the vertical axis as v(Ti), i.e., valence of titanium. As such, FIG. 3 indicates the relative electronic conductivity of the various lithium titanates, at various states of intercalation, with higher v(Ti) correlating to lower electronic conductivity. $Li_4Ti_5O_{12}$ is an example of lithium titanate having the titanium atoms in the +4 oxidation state.

During electrochemical intercalation or charging of conventional $Li_4Ti_5O_{12}$, phase transition from spinel to "rock salt"-type occurs wherein three lithium atoms are intercalated into the conventional $Li_4Ti_5O_{12}$ to produce $Li_7Ti_5O_{12}$. $Li_7Ti_5O_{12}$ has a higher electronic conductivity than the conventional $Li_4Ti_5O_{12}$ due to the transformation of titanium atoms in the conventional $Li_4Ti_5O_{12}$ from the +4 oxidation state to the +3 oxidation state during intercalation, as shown in FIG. 3 and as represented by the following equation:

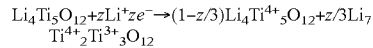

$$Li_4Ti_5O_{12} + zLi^+ze^- \rightarrow (1-z/3)Li_4Ti^{4+}{}_5O_{12} + z/3Li_7Ti^{4+}{}_2Ti^{3+}{}_3O_{12}$$

wherein z represents the number of lithium atoms that are intercalated into the $Li_4Ti_5O_{12}$. As such, the conventional $Li_4Ti_5O_{12}$ exhibits variable electronic conductivity based on the state of intercalation and zones of low and high electronic conductivity may exist during intercalation and discharge due to the disparate differences in electronic conductivity between the conventional $Li_4Ti_5O_{12}$ and $Li_7Ti_5O_{12}$. Poor electronic conductivity of the conventional $Li_4Ti_5O_{12}$ causes initial "training" of the cells by low current as well as prevention of a complete charge. These circumstances extremely limit opportunities of use of the conventional $Li_4Ti_5O_{12}$ for high rate applications.

In accordance with the present disclosure, it was surprisingly found that the following relationship exists:

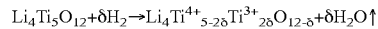

$$Li_4Ti_5O_{12} + \delta H_2 \rightarrow Li_4Ti^{4+}{}_{5-2\delta}Ti^{3+}{}_{2\delta}O_{12-\delta} + \delta H_2O\uparrow$$

In effect, reduction of $Li_4Ti_5O_{12}$ to form the $Li_4Ti_5O_{12-x}$ results in the transformation of titanium atoms in the $Li_4Ti_5O_{12}$ from the +4 oxidation state to the +3 oxidation state as a result of charge compensation, thereby exhibiting increased electronic conductivity of the $Li_4Ti_5O_{12-x}$ while retaining the same number of lithium and titanium atoms in the lithium titanate. Stated differently, an average valence of titanium in the lithium titanate of the present disclosure is less than 4. The practical result of the above finding is that the lithium titanate will exhibit less drastic changes in electronic conductivity at all stages of charge and discharge processes, as opposed to the conventional $Li_4Ti_5O_{12}$ that exhibits electronic conductivity that is near that of dielectric materials prior to charging, such that different zones of $Li_4Ti_5O_{12-x}$ and $Li_7Ti_5O_{12-x}$ will exhibit more uniform media for charge and discharge processes, as compared to conventional $Li_4Ti_5O_{12}$, which is advantageous for high-rate applications.

Since the same numbers of electrochemically active lithium and titanium atoms are present as are present in the $Li_4Ti_5O_{12}$, expected reversible electric power-generating capacity will be the same for the $Li_4Ti_5O_{12-x}$ as for the $Li_4Ti_5O_{12}$. The $Li_4Ti_5O_{12-x}$ also retains the same spinel structure as $Li_4Ti_5O_{12}$, which has excellent cycleability. As set forth above, typically, 0<x<0.02 in order to maintain the same spinel structure as the $Li_4Ti_5O_{12}$. More specifically, referring to FIG. 3, the lithium titanate of the present disclosure, by having the oxygen deficiency, shifts the $Li_4Ti_5O_{12-x}$ to a position represented by "A" in FIG. 3 due to the transformation of titanium atoms in the $Li_4Ti_5O_{12}$ from the +4 oxidation state to the +3 oxidation state, with the position represented by "B" indicating an intercalation state of the $Li_4Ti_5O_{12-x}$. The value of x, in order to maintain the same spinel structure as $Li_4Ti_5O_{12}$, is limited since lithium titanate with structure of $Li_2Ti_3O_7$ will form if the amount of titanium in the +3 oxidation state becomes too high. $Li_2Ti_3O_7$ has an orthorhombic crystal structure with space group Pbnm (62). Although $Li_2Ti_3O_7$ may be suitable for certain applications, the spinel structure of $Li_4Ti_5O_{12}$ is preferred due to the ability to intercalate more lithium into the structure than can be intercalated into the $Li_2Ti_3O_7$ and also due to the fact that $Li_4Ti_5O_{12}$ exhibits low volume change of from 8.3595 to 8.3538 Å between intercalated and deintercalated states, which provides the excellent cycleability.

A method of forming the $Li_4Ti_5O_{12-x}$ includes the step of providing a mixture of titanium dioxide and a lithium-based component. Titanium dioxide can be used both in the form of rutile and in the form of anatase, as well as any form of titanium oxide-hydroxide (such as $Ti(OH)_{2x}O_{2-x}$). Any lithium-based component that is typically used for forming $Li_4Ti_5O_{12}$ may be used. Typically, the lithium-based component is selected from the group of lithium carbonate, lithium hydroxide, lithium oxide, and combinations thereof, and the lithium-based component is typically at least 99% pure. Lithium salts or organic acids can also be used. Typically, the lithium-based component and titanium oxide are present in the mixture in amounts necessary to ensure an atomic ratio Li/Ti=0.8 in the final lithium titanate of the present disclosure.

The mixture including the titanium dioxide and the lithium-based component is sintered in a gaseous atmosphere comprising a reducing agent to form the lithium titanate. More specifically, the mixture is sintered at a temperature of at least 450° C., more typically from about 500 to 925° C., most typically from about 700 to about 920° C., for a period of at least 30 minutes, more typically from about 60 to about 180 minutes.

The reducing agent may be any agent that is capable of reducing the oxygen in the $Li_4Ti_5O_{12}$ and is typically selected from the group of hydrogen, a hydrocarbon, carbon monoxide and combinations thereof. The reducing agent is typically present in the gaseous atmosphere in a concentration of at least 0.1% by volume, more typically from about 1 to about 100% by volume, in order to sufficiently reduce the $Li_4Ti_5O_{12}$ to form the $Li_4Ti_5O_{12-x}$.

In addition to the reducing agent, the gaseous atmosphere typically includes another gas selected from the group of an inert, an inactive gas, and combinations thereof. Any inert gas may be used, such as any noble gas, in order to prevent unwanted side reactions during sintering and in order to prevent introduction of impurities into the $Li_4Ti_5O_{12-x}$. Inactive gas that may be used is, for example, pure nitrogen.

The following examples are meant to illustrate the present disclosure and are not to be view in any way as limiting to the scope of the disclosure.

EXAMPLES

Lithium titanate of the present disclosure having the formula $Li_4Ti_5O_{12-x}$ is formed according to the method of the disclosure as set forth above. More specifically, conventional $Li_4Ti_5O_{12}$ is first formed by forming a mixture including titanium dioxide and a lithium-based compound. The mixture is formed by introducing the titanium dioxide and the lithium-based compound into a vessel in the amounts shown in Table 1. The titanium dioxide and the lithium-based compound are mixed and milled in a ball mill for a period of about 60 minutes at least 150 rpm rotation speed using a particle size distribution measurement till particle size less than 5 mkm, more preferably less than 2 mkm, with unimodal distribution to ensure sufficient mixing of the titanium dioxide and the lithium-based component. The mixture is then sintered in a gaseous atmosphere, created by a gas or gas mixture with constant flow at temperatures and times as indicated in Table 1. The gas or gas mixture includes a reducing agent and an inert gas or inactive gas in the amounts indicated in Table 1. The resulting lithium titanate has the formula $Li_4Ti_5O_{12-x}$ with 0<x<0.02. Relevant properties of the lithium titanate of the present disclosure are also included in Table 1 below.

TABLE 1

| | Component | Example 1 | Example 2 | Example 3 |
|---|---|---|---|---|
| Mixture | Titanium Dioxide, pbw based on total weight of mixture | 72.992 | 80.655 | 76.632 |
| | Lithium-based Component A, pbw based on total weight of mixture | 27.008 | — | 14.178 |
| | Lithium-based Component B, pbw based on total weight of mixture | — | 19.345 | 9.190 |
| | Total | 100.0 | 100.0 | 100.0 |
| Gaseous Atmosphere | Reducing Agent A flow, L/(min · kg) based on total weight of mixture | 0.002 | — | — |
| | Reducing Agent B flow, L/(min · kg) based on total weight of mixture | — | 0.0025 | — |
| | Reducing Agent C flow, L/(min · kg) based on total weight of mixture | — | — | 0.05 |
| | Inert Gas A flow, L/(min · kg) based on total weight of mixture | 0.048 | 0.0225 | — |

TABLE 1-continued

| Component | Example 1 | Example 2 | Example 3 |
|---|---|---|---|
| Inactive Gas B flow, L/(min · kg) based on total weight of mixture | — | — | 0.095 |
| Total | 0.05 | 0.025 | 0.1 |
| Sintering Time, min | 120 | 100 | 180 |
| Sintering Temperature, °C. | 850 | 900 | 800 |
| X value in $Li_4Ti_5O_{12-x}$ formula | 0.009 ± 0.001 | 0.015 ± 0.001 | 0.005 ± 0.001 |
| Reversible Electric Power-Generating Capacity, mA*hrs/g | 168 | 170 | 160 |
| Crystal Structure Parameter (a), Å, at 300K | 8.36012 | 8.35978 | 8.36023 |
| Logarithm of DC Electronic Conductivity, (S cm$^{-1}$), at 300K | −5.2 | −4.7 | −5.9 |

Lithium-based Component A is $Li_2CO_3$.
Lithium-based Component B is LiOH.
Reducing Agent A is $H_2$.
Reducing Agent B is $CH_4$ (methane).
Reducing Agent C is CO (carbon monoxide).
Inert Gas A is Argon.
Inactive Gas B is $N_2$ (nitrogen).

Comparative Example

Conventional lithium titanate having the formula $Li_4Ti_5O_{12}$ is formed in the same manner as set forth above; however the reducing agent is not present in the gaseous atmosphere. The amounts of the components used to form the conventional lithium titanate are shown below in Table 2, along with relevant properties of the conventional lithium titanate.

TABLE 2

| | Component | Comp. Example 1 | Comp. Example 2 |
|---|---|---|---|
| Mixture | Titanium Dioxide, pbw based on total weight of mixture | 72.992 | 80.655 |
| | Lithium-based Component A, pbw based on total weight of mixture | 27.008 | — |
| | Lithium-based Component B, pbw based on total weight of mixture | — | 19.345 |
| | Total | 100 | 100 |
| Gaseous Atmosphere | Inert Gas A flow, L/(min · kg) based on total weight of mixture | 0.1 | — |
| | Inactive Gas B flow, L/(min · kg) based on total weight of mixture | — | 0.2 |
| | Total | 0.1 | 0.1 |
| | Sintering Time, min | 180 | 120 |
| | Sintering Temperature, °C. | 850 | 900 |
| | X value in $Li_4Ti_5O_{12-x}$ formula | 0 ± 0.0005 | 0 ± 0.0005 |
| | Reversible Electric Power-Generating Capacity, mA*hrs/g | 145 | 150 |
| | Crystal Structure Parameter (a), Å, at | 8.36055 | 8.35915 |

TABLE 2-continued

| Component | Comp. Example 1 | Comp. Example 2 |
|---|---|---|
| 300K Logarithm of DC Electronic Conductivity, (S cm$^{-1}$), at 300K | <−9 | ~−9 |

Results

With reference to the reversible electric power-generating capacity and the electronic conductivity of the Examples and the Comparative Example, it is apparent that the lithium titanates of the present disclosure exhibit higher electronic conductivity than conventional lithium titanates of the Comparative Examples, while exhibiting even higher reversible electric power-generating capacity.

Figure 4:
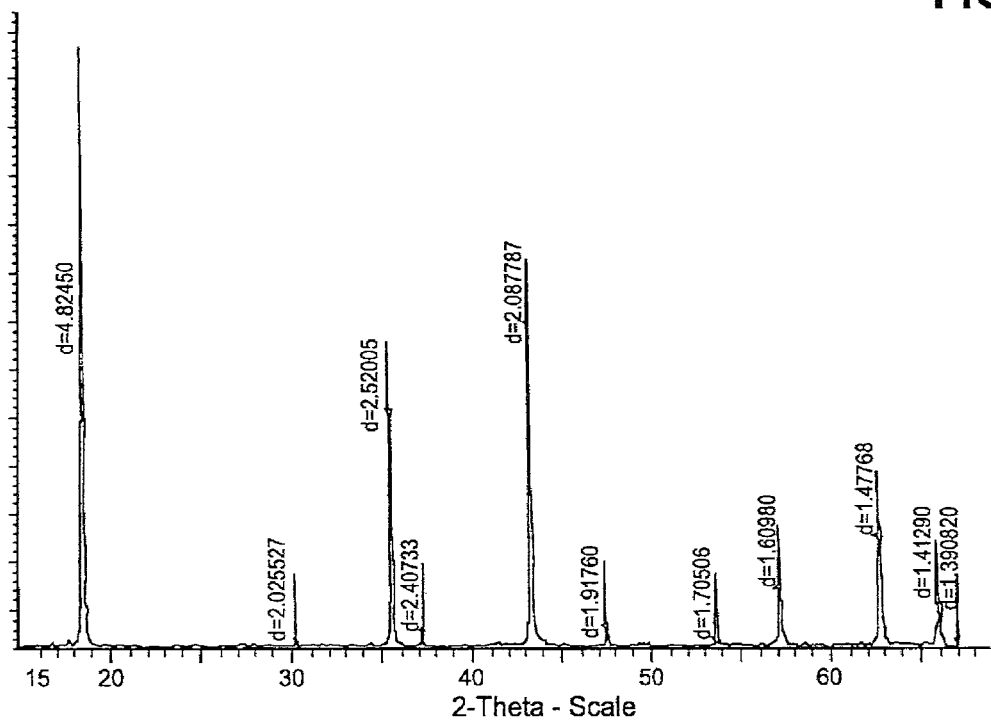
FIG. 4 is an X-ray diffraction spectra for conventional $Li_4Ti_5O_{12}$ of the prior art, synthesized according to Comp. Example 1 in Table 2.
Figure 5:
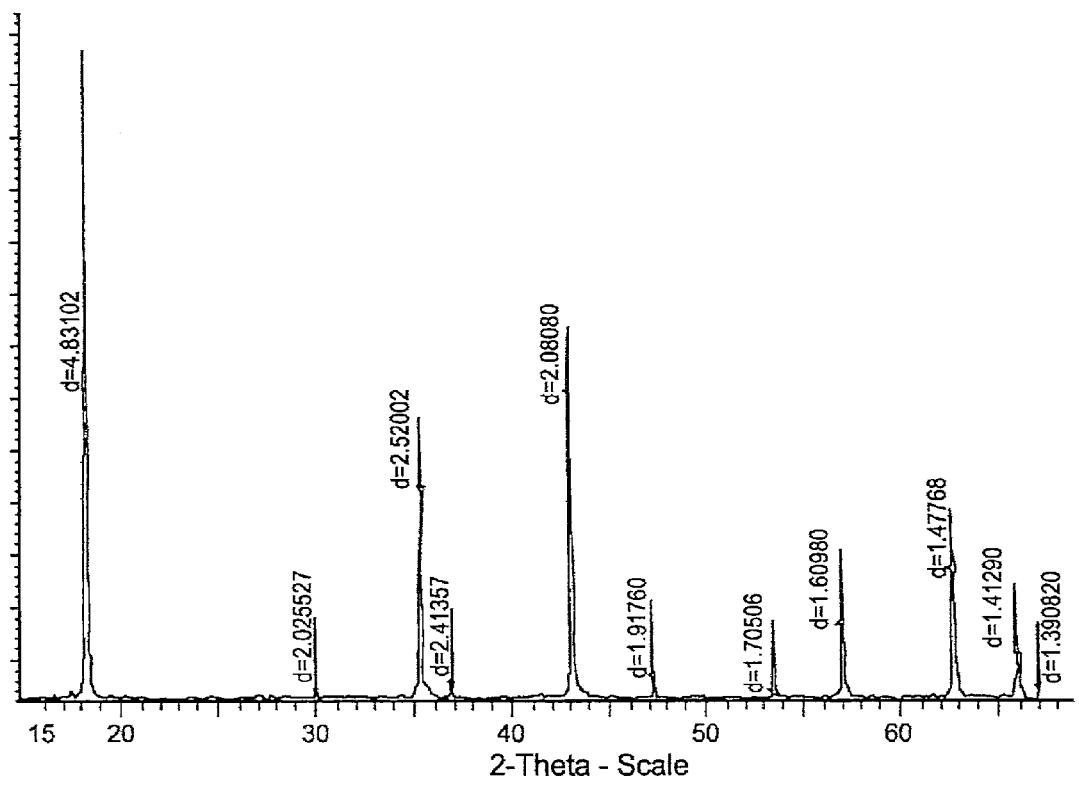
FIG. 5 is an X-ray diffraction spectra for $Li_4Ti_5O_{11.985}$ of the present disclosure, synthesized according to Example 2 in Table 1.

Specifically, XRD spectra are received on an x-ray diffractometer Bruker D4 on CuK$_\alpha$ radiation with Sol-X detector. All samples listed in Table 1 and 2 give well-defined spectra correspond to cubic structure (Sp. gr. Fd-3m (227)). Small amounts of residual $TiO_2$ (<0.5%) are present in most of samples. Using a full-profile analysis method, with conventional structure model (see for example, S. Scharner, W. Wepner, P. Schmid-Beurmann. Evidence of Two-Phase Formation upon Lithium insertion into the $Li_{1.33}Ti_{1.67}O_4$ Spinel, Journal of the Electrochemical Society. v. 146, I. 3, pp. 857-861, 1999), parameter (a) of a cubic crystal lattice is calculated, and is shown in the Tables 1 and 2. Two typical spectra, one for $Li_4Ti_5O_{12}$ of the prior art represented by Comp. Examples 1 and 2, and one for $Li_4Ti_5O_{11.985}$ of the present disclosure represented by Example 2, are presented on FIGS. 4 and 5, respectively.

Figure 6:
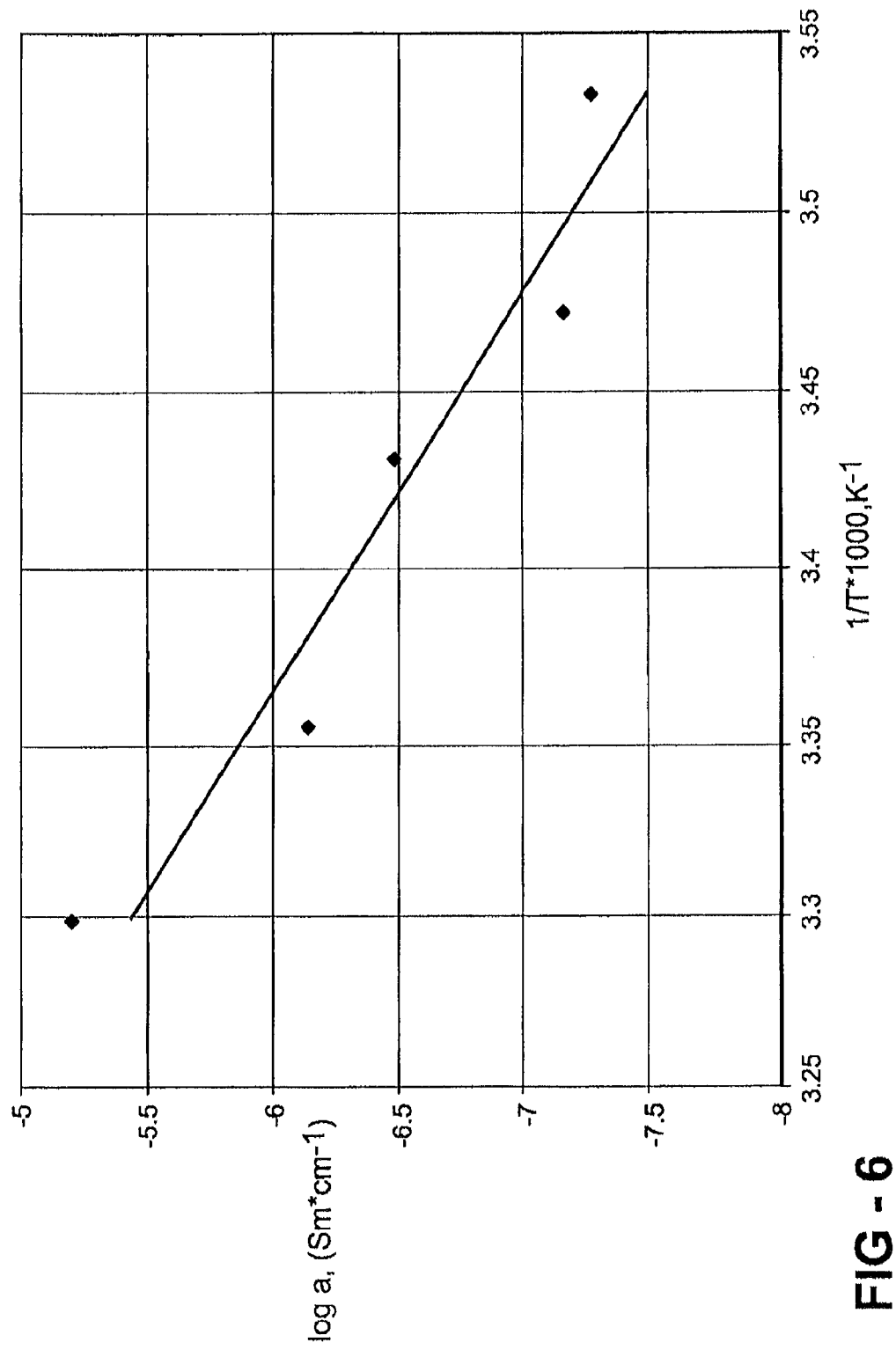
FIG. 6 is a graph showing a dependence of $\log(\sigma)$ vs. 1/T measured for $Li_4Ti_5O_{11.985}$ of the present disclosure, synthesized according to Example 2 in Table 1 and measured by the 4 probe method.

Electronic conductivity of the Examples is measured on 20 mm diameter, 2-3 mm thick pellets that have been pressed and tempered inside powder samples under synthesis conditions until an equilibrium state is reached. Measurements are made by the 4-probe method on direct current, under potential of 90 volts. Attempts to receive reliable data for $Li_4Ti_5O_{12}$ samples (Table 2, Comp. Examples 1 and 2) are unsatisfactory, as the conductivity of these samples lies very close to a low limit of measurement for this method. Therefore, only order of conductivity is determinate. Results of measurements for $Li_4Ti_5O_{11.985}$, synthesized according to Example 2 in Table 1, in a narrow temperature interval of about room temperature, are shown on FIG. 6. Main sources of measurement discrepancies are the nature of compacted powder samples with significant porosity, as well as proximity to grain boundaries and contact effects.

Figure 7:
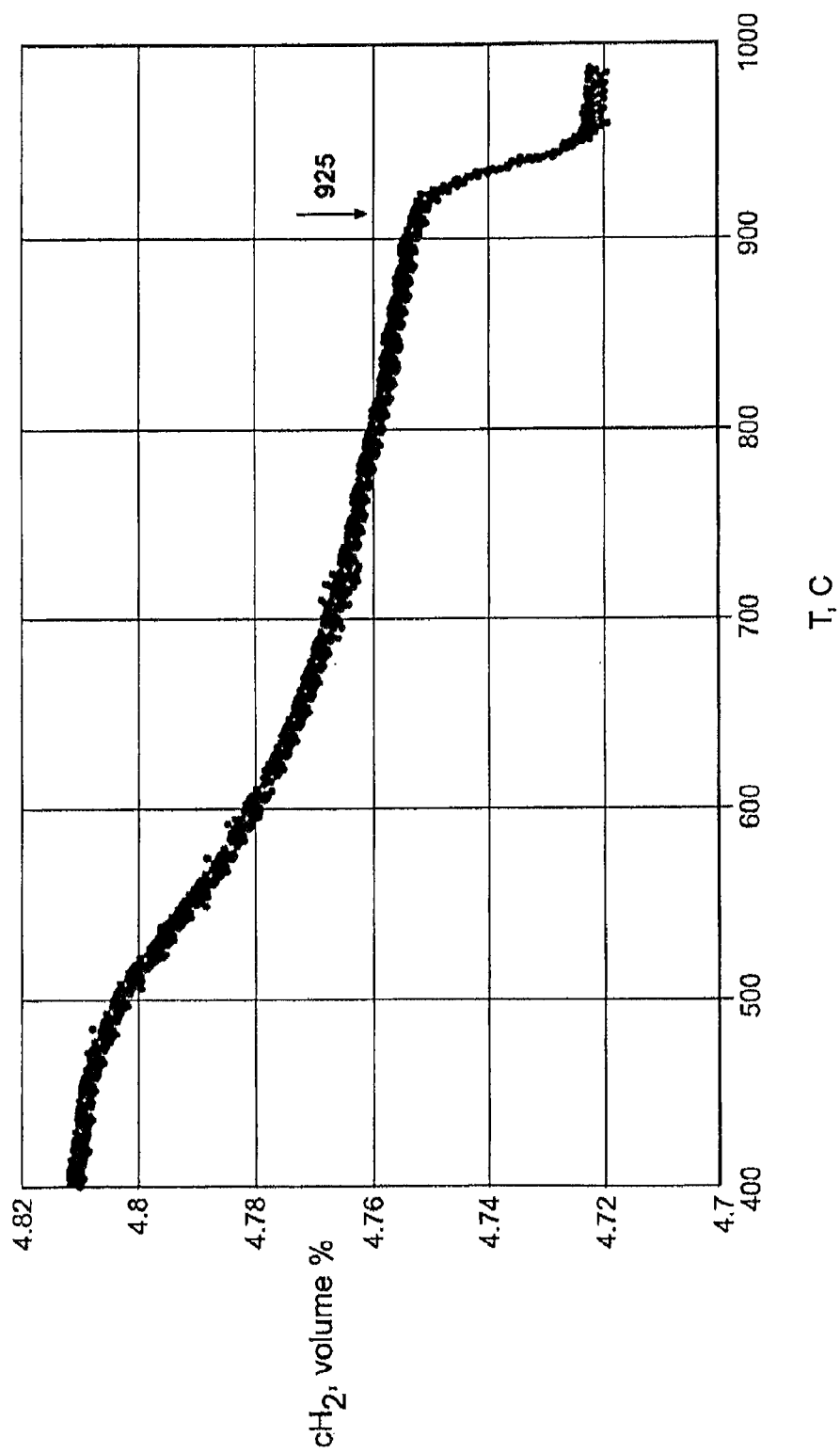
FIG. 7 is a kinetic curve of a sintering step whereby $Li_4Ti_5O_{12}$ is reduced by a H2/Argon gas mixture (4.81. vol, % $H_2$), representing dependence of concentration of $H_2$ on temperature during heating with constant temperature increase of 2.5° C./min.
Figure 8:
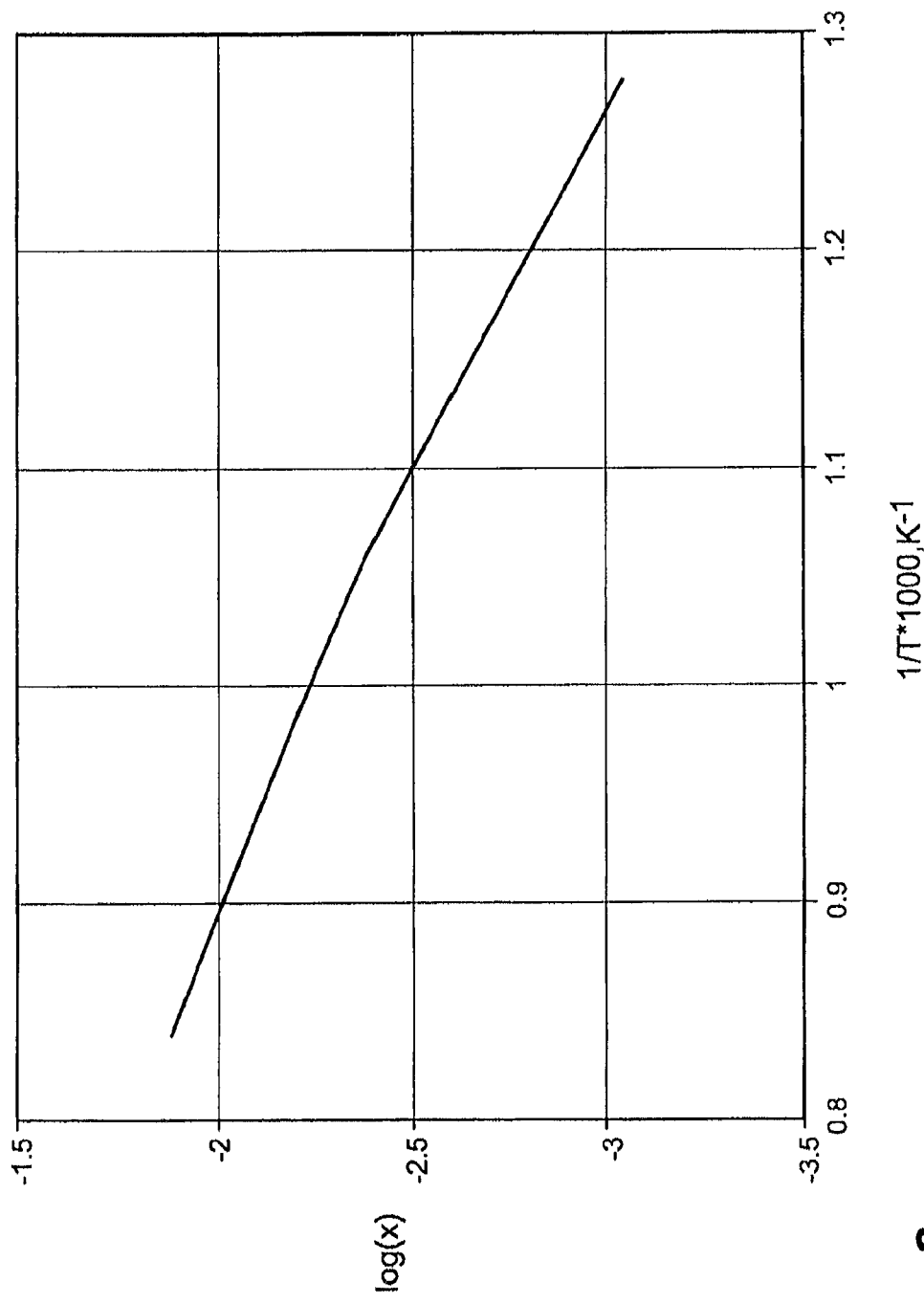
FIG. 8 is a kinetic curve of the sintering step of FIG. 7 in $\log(x)$ vs. 1/T coordinates, wherein x is x in $Li_4Ti_5O_{12-x}$.

The kinetics of the sintering step for reducing the $Li_4Ti_5O_{12}$ is tested through the Temperature Controlled Reduction method. During linear heating of samples under gaseous atmosphere including the reducing agent, gas concentration is measured after flowing past the sample. Referring to FIG. 7, dependence of concentration of hydrogen, i.e., the reducing agent, against temperature of $Li_4Ti_5O_{12}$ is shown. A difference between initial concentration of hydrogen and concentration of hydrogen after the gaseous atmosphere flows past the sample gives an amount of hydrogen used for the sintering process. By integration of this curve, using values of sample mass and gas mixture flow, it is possible to calculate the value of x in the formula $Li_4Ti_5O_{12-x}$ as a function of temperature. The reduction during the sintering step becomes appreciable after 450° C. and proceeds smoothly until 925° C., FIG. 8 shows a dependence of the logarithm of x in formula $Li_4Ti_5O_{12-x}$, against reverse absolute temperature (in Kelvin). This curve has an Arrhenius-like character and is close to linear in the temperature interval 500° C.<T<925° C.

Figure 9:
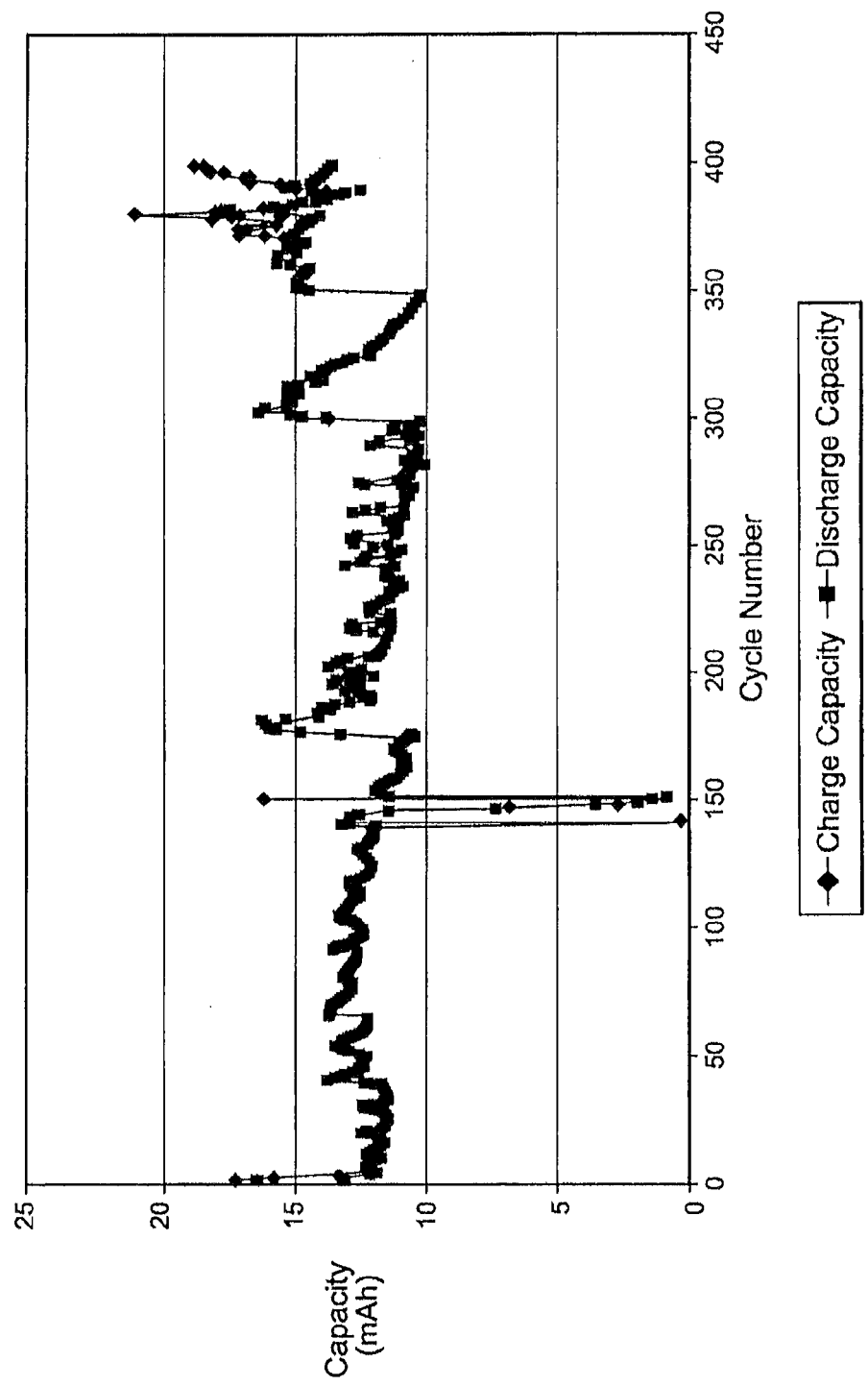
FIG. 9 is a graph showing a dependence of electric power generating capacity (mAh) vs. a number of cycles for a cell including an electrode with $Li_4Ti_5O_{12-x}$ of the present disclosure wherein a counter electrode is lithium metal.
Figure 10:
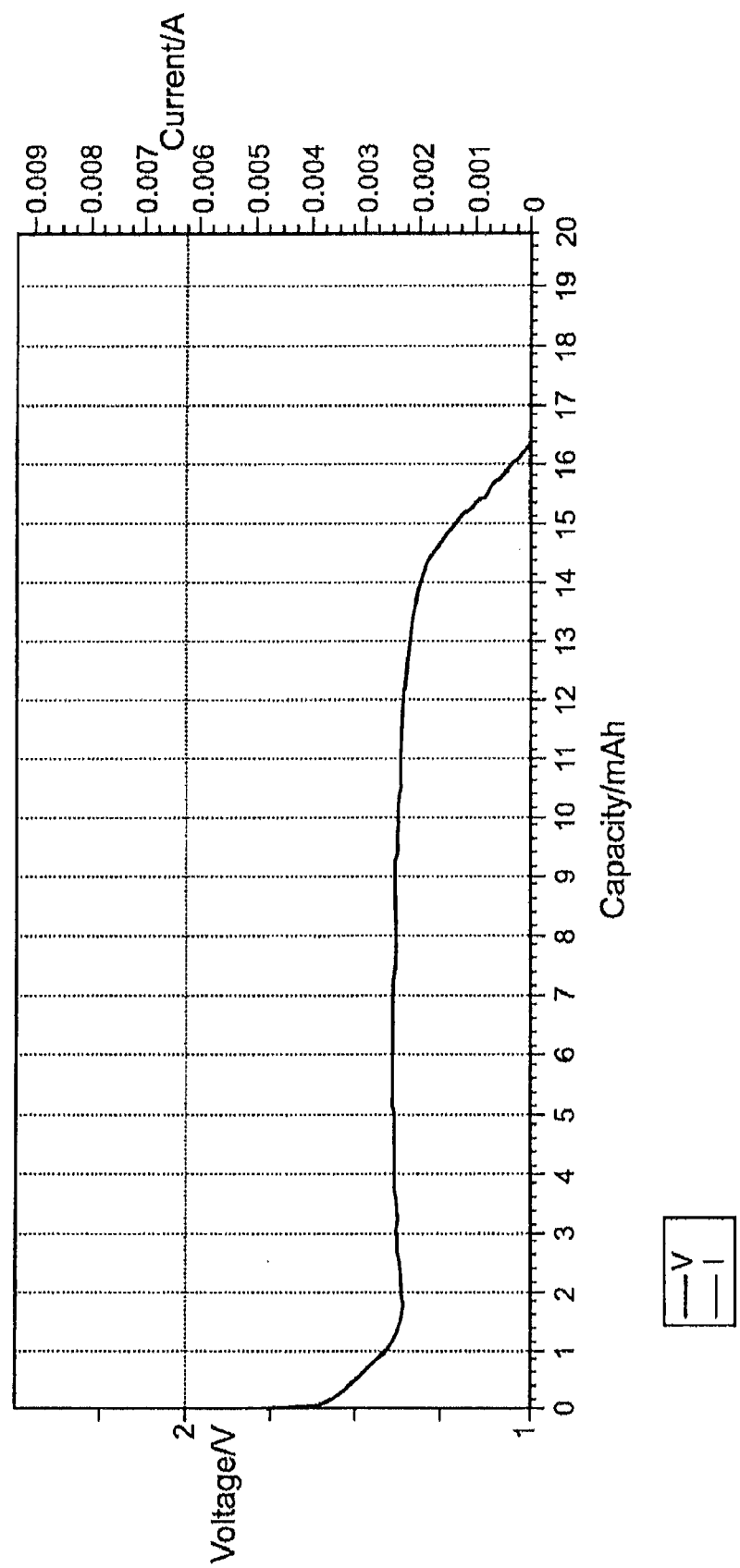
FIG. 10 is a graph showing a first discharge of a cell including an electrode with $Li_4Ti_5O_{12-x}$ of the present disclosure wherein a counter electrode is lithium metal.
Figure 11:
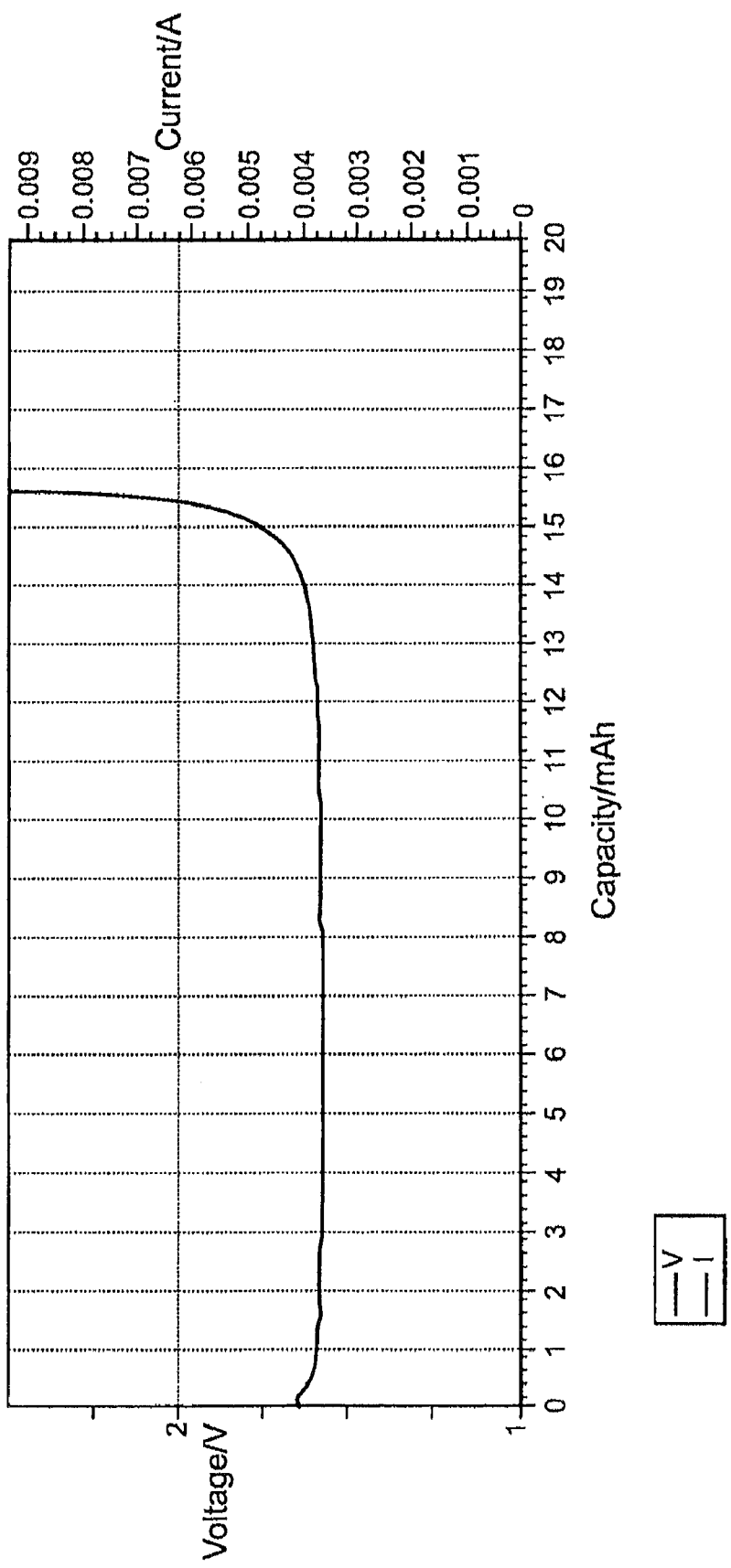
FIG. 11 is a graph showing a second charge of the cell including the electrode with $Li_4Ti_5O_{12-x}$ of the present disclosure wherein the counter electrode is lithium metal.
Figure 12:
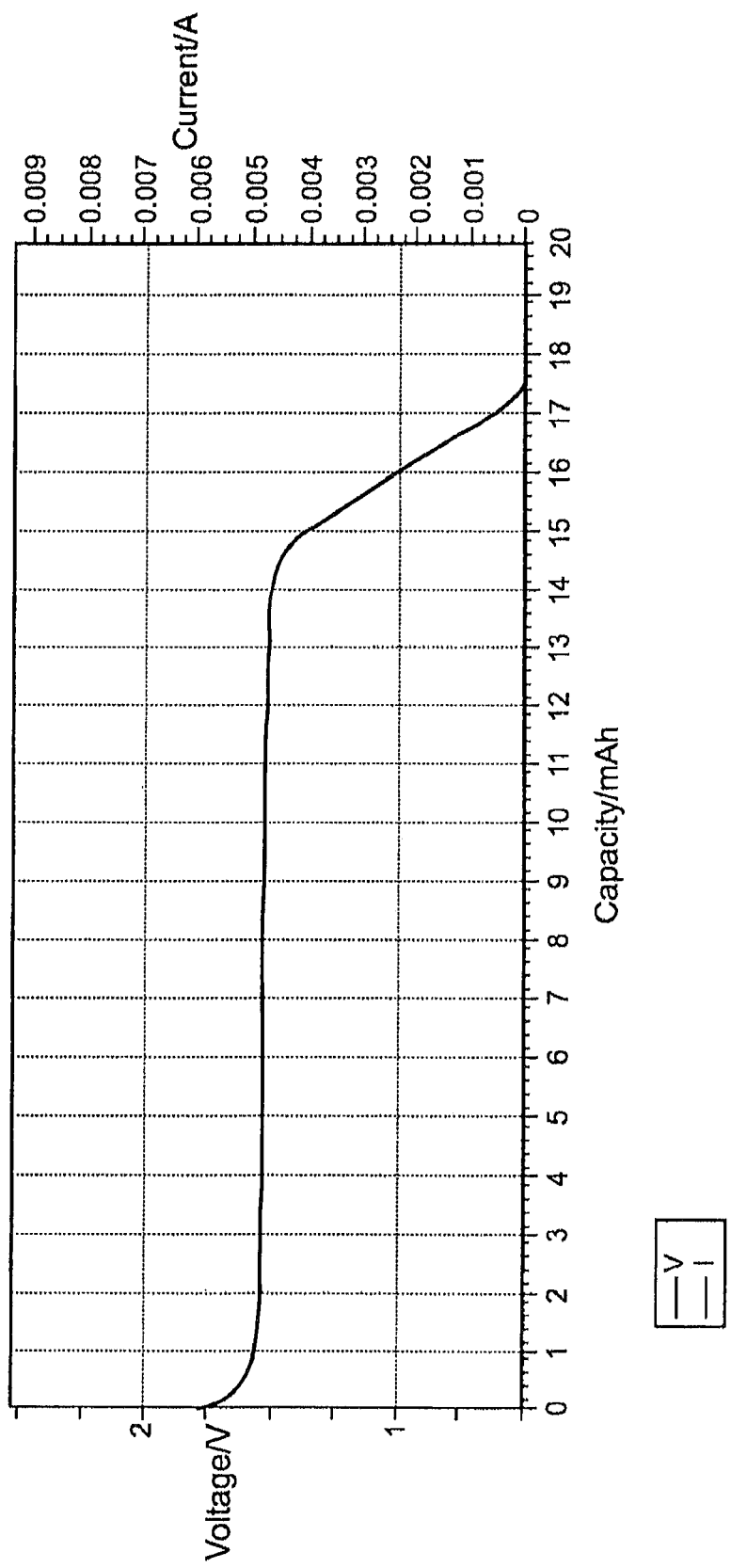
FIG. 12 is a graph showing a $382^{nd}$ discharge of the cell including the electrode with $Li_4Ti_5O_{12-x}$ of the present disclosure wherein the counter electrode is lithium metal.
Figure 13:
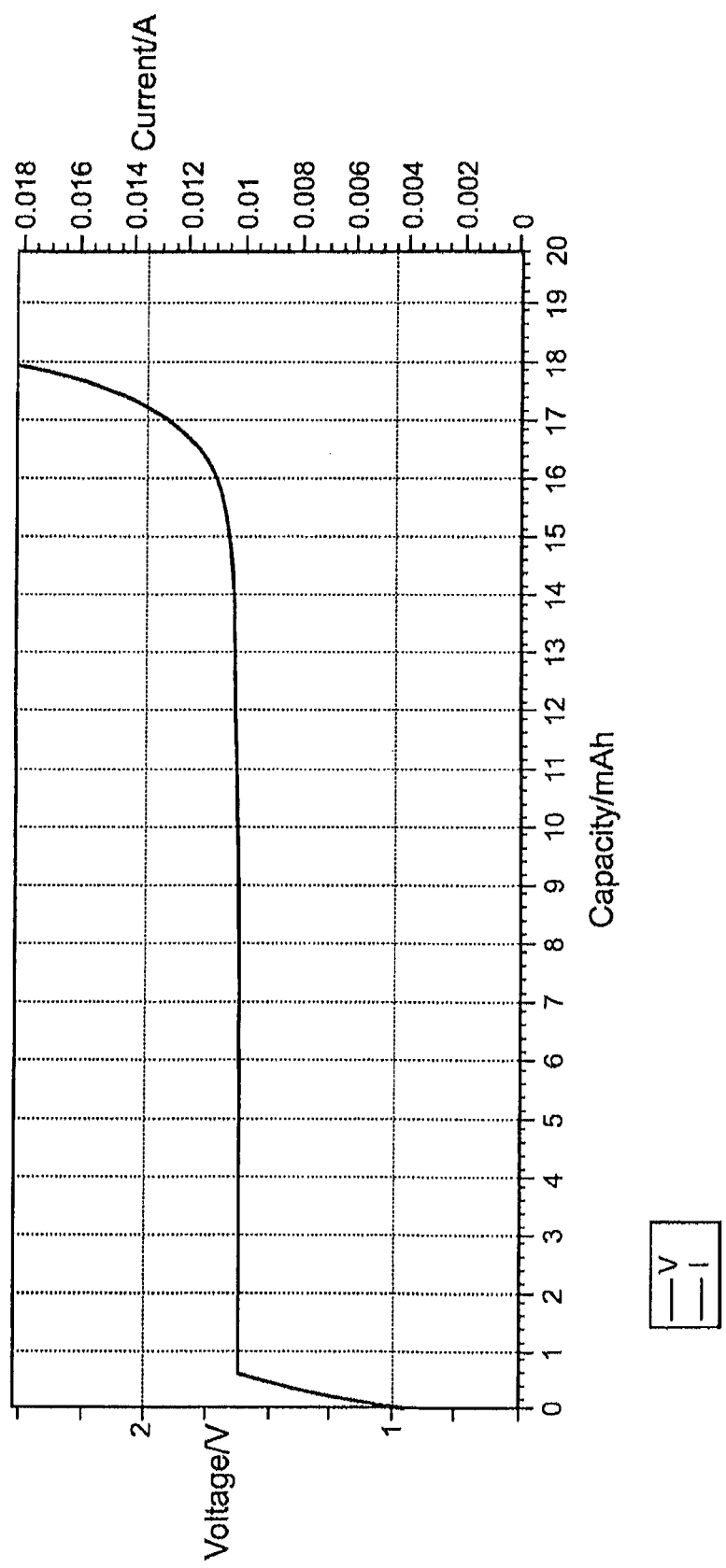
FIG. 13 is a graph showing a $382^{nd}$ charge of the cell including the electrode with $Li_4Ti_5O_{12-x}$ of the present disclosure wherein the counter electrode is lithium metal.

FIG. 9 shows that the lithium-based cell that includes the $Li_4Ti_5O_{12-x}$, maintains electric power generating capacity after many cycles, and FIGS. 10-13 illustrate flat charge and discharge curves of the $Li_4Ti_5O_{12-x}$, even after many cycles of charge and discharge.

The quality of the active substance affecting the performance of a lithium secondary battery is obviously regulated by its composition and is also associated with various powder properties including particle size, particle size distribution, specific area, crystallinity, crystal size, crystal size distribution, pore volume, pore volume distribution and crystallinity. For these properties of the active substance, the crystallinity is determined by the heating temperature and heating time when mixing and heating the lithium compound and titanium compound selected, and the powder properties are determined by the subsequent pulverization and sieving.

However, for example, in case improvement of the crystallinity and micronization of the crystal particles are regulated simultaneously, improvement of the crystallinity is achieved by focusing on the heating temperature and heating time by setting a high temperature and long heating time while micronization is generally regulated at low temperature for a short time. The regulating range is thus very narrow because the conflicting operations must be performed simultaneously. Or similarly, for example, when the active substance is produced from secondary particles and in case coarsening of the secondary particles and micronization of the primary particles are regulated simultaneously, the coarsening of the secondary particles is achieved by high temperature and long heating time while the micronization of the primary particles is generally regulated at low temperature for a short time.

Similar to the aforementioned case, the regulating range is thus very narrow because the conflicting operations must be performed simultaneously. Furthermore, the regulating range is even narrower if the aforementioned four items are to be regulated to reach certain targets. Accordingly, the introduction of new production parameters is expected for regulating even higher quality for the active substance for high battery performance.

The methods proposed for synthesizing lithium titanate include mixing lithium carbonate powder or lithium hydroxide powder with titanium oxide by various mixing methods and using the same as the precursor for calcination, using a synthetic product or mixture containing titanium and lithium obtained from solutions containing both titanium and lithium ingredients as the precursor for calcination and preparing a mixed slurry of titanium compound powder and a solution containing lithium, followed by depositing a lithium compound by spray-drying, to produce a mixture of titanium compound powder and lithium compound and using the same as the precursor for calcination.

According to the present disclosure, multiple lithium compounds are utilized as the starting materials at the same time for thermal synthesis of lithium titanate, in that the thermal synthesis is conducted by focusing on the behavior of the inherent property of each lithium compound and their behaviors in the reaction with the titanium compound and regulating the powder properties including the crystalline conditions such as crystallinity, crystal size and crystal size distribution and powder properties such as powder particle size and specific area that reflect the quality of the lithium titanate, so that the quality can meet the performance required of lithium batteries.

The method of the present disclosure for producing lithium titanate involves thermal synthesis after mixing two or more lithium compounds with titanium oxide. The atomic transfer accompanying the formation of lithium titanate during the thermal synthesis of lithium titanate is considered to depend on whether it is a solid-solid reaction or liquid-solid reaction. Once lithium titanate is formed, the growth of the crystal particles depends on the existing condition of the surrounding particles, temperature and time.

Alluding to the above, the lithium carbonate melts at 726° C. and decomposes to give lithium oxide and carbon dioxide at temperatures higher than 1500° C. On the other hand, lithium hydroxide melts at 450° C. and decomposes to give lithium oxide at temperatures higher than 924° C. Specifically, the heating process for synthesizing lithium titanate is not the same as in the case of utilizing a mixture of lithium carbonate and titanium oxide and the case of utilizing a mixture of lithium hydroxide and titanium oxide in thermal synthesis. When synthesis by calcination is conducted with titanium oxide at a temperature below the melting point of the respective lithium compound, lithium carbonate and titanium oxide undergo a solid-solid reaction while lithium hydroxide and titanium oxide undergo a liquid-solid reaction, at 500° C. for example. In case of a liquid-solid reaction, the atomic transfer accompanying the formation of lithium titanate is considered to proceed more readily compared to the case of a solid-solid reaction.

Once lithium titanate is formed, the growth of the crystal particles depends on the existing condition of the surrounding particles, temperature and time. The temperature and time vary with the type of starting materials utilized, which expands the quality control range for lithium titanate due to the new parameters. In the present disclosure, representative compounds of lithium carbonate, lithium hydroxide and titanium oxide are products procurable in the industry, but the lithium compounds and titanium compound are not limited to them.

Also, multiple titanium compounds can be utilized, and pre-prepared titanium and lithium compounds can be utilized as part of the starting material for the thermal synthesis.

Application example, include and not limited to titanium oxide powder (−325 mesh) produced by Alfa Aesar, lithium carbonate powder (−325 mesh) produced by FMC and lithium hydroxide powder (−200 mesh) produced by Science Lab were utilized. In addition to 30.5 g titanium oxide, sample 1 containing 11.3 g lithium carbonate, sample 2 containing 8.5 g lithium carbonate and 3.3 g lithium hydroxide, sample 3 containing 5.7 g lithium carbonate and 6.5 g lithium hydroxide, sample 4 containing 2.8 g lithium carbonate and 9.8 g lithium hydroxide and sample 5 containing 13.0 g lithium hydroxide were individually mixed thoroughly in a mixing crucible. The mixtures were fed individually to a ceramic reactor, and thermal synthesis was conducted in a muffle furnace. The heating conditions include heating from room temperature to 150° C. and maintaining the temperature for 2 h and subsequently heating to 450° C. and maintaining the temperature for 2 h and further heating to 950° C. and maintaining the temperature for 8 h, followed by cooling to room temperature to obtain the synthetic products.

Growth of primary particles and an inhibitory effect on the secondary particle size with increasing quantity of starting material lithium hydroxide are verified. Specifically, despite the fact that the same titanium oxide is utilized and the heating condition is the same, better quality can be regulated by increasing the quantity of lithium hydroxide to replace lithium carbonate. Also, differences in crystallinity are verified. The differences in the batteries are evaluated and the performance is verified. These new production parameters are provided by the present disclosure to give the aforementioned differences in obtaining lithium titanate of desired quality.

While various lithium-based materials and methods of forming the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope, of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

We claim:

1. A method of forming a lithium-based material, comprising the steps of:
    combining a first quantity of a first lithium-based component and a second quantity of a second lithium-based component with a titanium-based component to form a mixture, the first lithium-based component having a first melting point and the second lithium-based component having a second melting point higher than the first melting point of the first lithium-based component; and
    heating the mixture to a first temperature above the first melting point but below the second melting point for a period of time to form a resultant end product;
    wherein the resultant end product comprises a lithium titanate having the formula:

$$Li_4Ti_5O_{12-x}$$

wherein x is greater than 0 and less than 12.

2. The method of claim 1, further comprising the step of: cooling the a resultant end product.

3. The method of claim 1, wherein the first lithium-based component comprises lithium hydroxide and wherein the second lithium-based component comprises lithium carbonate.

4. The method of claim 3, wherein the first quantity of lithium hydroxide is greater than the second quantity of lithium carbonate.

5. The method of claim 1, wherein the first lithium-based component and the second lithium-based component are selected from the group consisting of lithium carbonate, lithium hydroxide, lithium oxide, and combinations thereof.

6. The method of claim 1, wherein the titanium-based component is selected from the group consisting of titanium oxide and titanium dioxide.

7. The method of claim 1, wherein the first lithium-based component comprises lithium hydroxide, and wherein the first temperature is above about 450° C. but below about 726° C.

8. The method of claim 1, wherein the resultant end product is formed by way of a liquid-solid reaction between the first lithium-based component and the titanium-based component and by way of a solid-solid reaction between the second lithium-based component and the titanium-based component.

9. The method of claim 8, wherein the liquid-solid reaction occurs at a faster rate than the solid-solid reaction.

10. The method of claim 1, wherein the combining step is performed in a ceramic reactor, and wherein the heating step is performed in a muffle furnace.

11. The method of claim 1, wherein the resultant end product comprises a lithium titanate.

12. A method of forming a lithium-based material, comprising the steps of:
    combining a first quantity of a first lithium-based component and a second quantity of a second lithium-based component with a titanium-based component to form a mixture, the first lithium-based component having a first melting point and the second lithium-based component having a second melting point higher than the first melting point of the first lithium-based component;
    heating the mixture to a first temperature below the first melting point and the second melting point and maintaining the mixture at the first temperature;
    heating the mixture to a second temperature above the first melting point but below the second melting point and maintaining the mixture at the second temperature; and
    heating the mixture to a third temperature above the first melting point and the second melting point and maintaining the mixture at the third temperature to form a resultant end product;
    wherein the resultant end product comprises a lithium titanate having the formula:

$$Li_4Ti_5O_{12-x}$$

wherein x is greater than 0 and less than 12.

13. The method of claim 12, further comprising the step of: cooling the a resultant end product.

14. The method of claim 12, wherein the first lithium-based component comprises lithium hydroxide and wherein the second lithium-based component comprises lithium carbonate.

15. The method of claim 14, wherein the first quantity of lithium hydroxide is greater than the second quantity of lithium carbonate.

16. The method of claim 12, wherein the first lithium-based component and the second lithium-based component are selected from the group consisting of lithium carbonate, lithium hydroxide, lithium oxide, and combinations thereof.

17. The method of claim 12, wherein the titanium-based component is selected from the group consisting of titanium oxide and titanium dioxide.

18. The method of claim 12, wherein the first temperature is below 450° C., the second temperature is between about 450° C. but below about 726° C., and wherein the third temperature is above 726° C.

19. The method of claim 18, wherein the first temperature is about 150° C., and wherein the second temperature is about 950° C.

20. The method of claim 12, wherein each of the heating steps include maintaining the mixture at the stated temperature for a period of time of about two hours.

21. A method of forming a lithium-based material, comprising the steps of:
   combining a first quantity of lithium hydroxide component and a second quantity of lithium carbonate with a titanium-based component to form a mixture;
   heating the mixture to a first temperature above a melting point of the lithium hydroxide but below a melting point of the lithium carbonate and maintaining the mixture at the first temperature; and
   heating the mixture to a second temperature above the melting point of the lithium carbonate and maintaining the mixture at the second temperature to form a lithium titanate having the formula:

$$Li_4Ti_5O_{12-x}$$

wherein x is greater than 0 and less than 12.

22. The method of claim 12, wherein the resultant end product is formed by way of a liquid-solid reaction between the first lithium-based component and the titanium-based component and by way of a liquid-solid reaction between the second lithium-based component and the titanium-based component.

23. The method of claim 12, wherein the resultant end product comprises a lithium titanate.

24. A method of forming a lithium titanate having the following formula:

$$Li_4Ti_5O_{12-x}$$

wherein x is greater than 0 and less than 12, said method comprising the steps of:
   providing a mixture of titanium oxide and a lithium-based component such that the lithium-based component and the titanium oxide are present in the provided mixture in amounts necessary to ensure an atomic ratio of lithium to titanium of 0.8, wherein the lithium-based component is selected from the group of a synthetic product, lithium carbonate powder and lithium hydroxide powder;
   utilizing the provided mixture as a precursor for calcination; and,
   sintering the mixture in a gaseous atmosphere comprising a reducing agent to form the lithium titanate.

* * * * *